March 25, 1941.  C. E. KILBOURNE  2,236,291
DYNAMOELECTRIC MACHINE
Filed Nov. 17, 1939

Inventor:
Charles E. Kilbourne,
by Harry E. Dunham
His Attorney.

Patented Mar. 25, 1941

2,236,291

UNITED STATES PATENT OFFICE 2,236,291

DYNAMOELECTRIC MACHINE

Charles E. Kilbourne, Schenectady, N. Y., assignor to General Electric Company, a corporation of New York Application November 17, 1939, Serial No. 304,973

7 Claims. (Cl. 171—252)

My invention relates to dynamoelectric machines and more particularly to an improved laminated pole piece construction for machines provided with salient poles.

In dynamoelectric machines provided with salient poles, various arrangements have been provided for securing together the laminations forming the core of these pole pieces. These laminations have been secured together by bolts, rivets, and line welds of various types, but in the case of bolts and rivets, the cross-section of the pole core has been varied by the addition of these elements and the surrounding air gaps, and with line welds on the edges of the laminations, the core loss has been increased by the provision of short-circuiting paths through the welds for circulating currents between the laminations.

An object of my invention is to provide an improved dynamo-electric machine construction utilizing laminated pole piece cores secured together at points removed from the outer edges of the laminations without the introduction of additional elements for thus securing together the laminations.

Another object of my invention is to provide an improved arrangement for securing together the laminations of a dynamo-electric machine pole piece.

A further object of my invention is to provide an improved and simplified arrangement of the laminations of a dynamo-electric machine pole piece and an arrangement for securing together these laminations.

Further objects and advantages of my invention will become apparent and my invention will be better understood from the following description referring to the accompanying drawing, and the features of novelty which characterize my invention will be pointed out with particularity in the claims annexed to and forming part of this specification.

Figure 1:
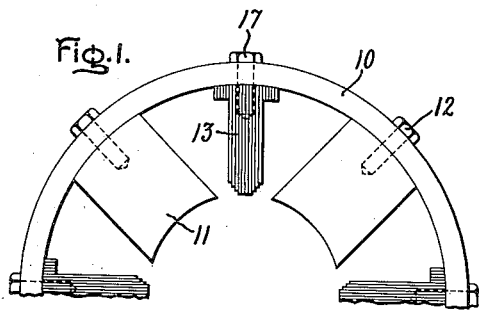
Figure 2:
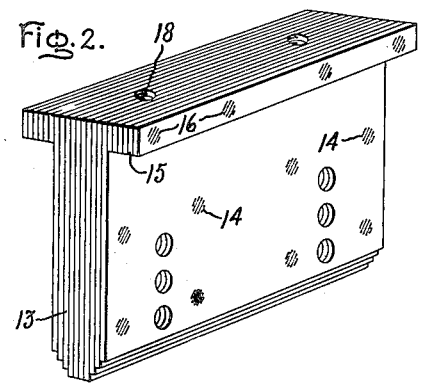
Figure 3:
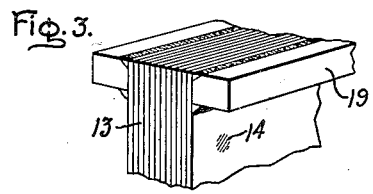
Figure 4:
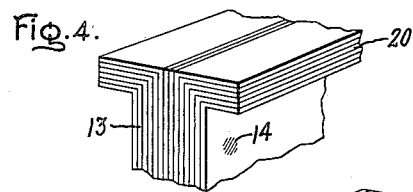
Figure 5:
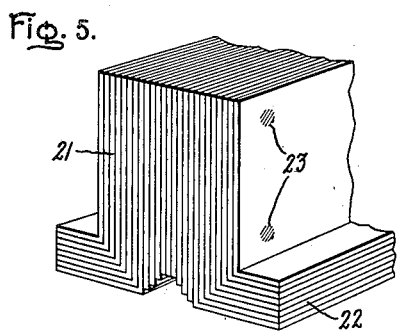
Figure 6:
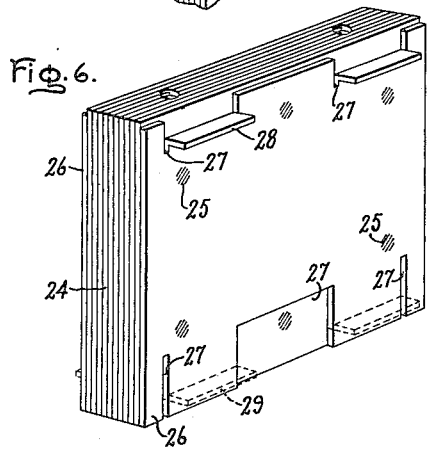
Figure 7:
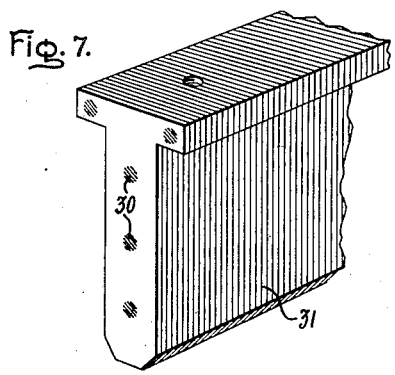
Figure 8:
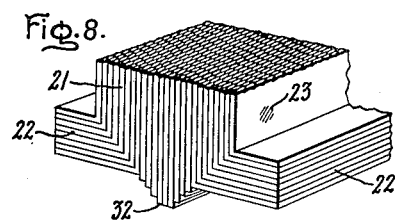

In the drawing, Fig. 1 illustrates a part of a stationary member of a dynamoelectric machine provided with my improved laminated pole pieces; Fig. 2 is an enlarged perspective view of one of the pole pieces shown in Fig. 1; Fig. 3 is a perspective view of a part of a pole piece illustrating a modification of the arrangement shown in Fig. 2; Fig. 4 is a perspective view of a part of a pole piece illustrating another modification of the arrangement shown in Fig. 2; Fig. 5 is a perspective view of a part of a pole piece illustrating a further modification of my improved pole piece; Fig. 6 is a perspective view of a pole piece illustrating a still further modification of my invention; Fig. 7 is a perspective view of a part of a pole piece illustrating another modification of my invention; and Fig. 8 is a perspective view of a part of a pole piece providing a convex pole face as another modification of my invention.

Referring to the drawing, I have shown in Fig. 1 a dynamoelectric machine provided with a stationary member having a frame 10 of magnetic material to which main pole pieces 11 are secured by bolts 12. Commutating pole pieces are arranged between adjacent main pole pieces 11 and comprise a plurality of laminations 13 which extend longitudinally of the machine. As is more clearly shown in Fig. 2, such a pole piece is formed of a relatively small number of laminations as compared to the conventional type pole piece wherein the laminations extend circumferentially of the machine, and the desired laminated structure is achieved with a relatively narrow stacking of laminations. With such an arrangement, I have found it possible to spot weld together adjacent laminations and to secure together an entire pole piece by providing a plurality of welds 14 arranged in spaced apart relation through the length and depth of the laminations. Furthermore, to insure against the provision of short-circuit paths between the laminations through which circulating currents might flow and increase the core loss of the machine, these welds 14 are made through the assembled laminations at points removed from the edges thereof. Thus, circulating currents which might be produced in the outer edges of the laminations by flux variations produced therein by the rotation of the teeth of the rotatable member of the machine past these outer edges will not be short-circuited through these lamination welds. In order to provide a better flux conducting section between the core of the pole piece and the magnet frame 10, I arrange a plurality of relatively narrow laminations 15 adjacent each side of the end of the pole piece adjacent the magnet frame and secure these laminations to the laminations 13 by spot welds 16 which extend throughout the laminated assembly. This pole piece is secured to the magnet frame 10 by bolts 17, which threadedly engage openings 18 formed in the outer end of the pole piece.

Fig. 3 illustrates another pole piece arrangement of longitudinally extending laminations 13 secured together by spot welds 14 arranged at spaced apart points over the surface of the laminations removed from the edges thereof to provide a laminated pole core similar to the arrangement shown in Fig. 2. In this arrangement, an additional pole piece contact section between the pole piece proper and the magnet frame 10 is provided by welding bars 19 of magnetic material on each side of the assembled laminations 13 on each of the outer laminations adjacent the end thereof adapted to be placed in contact with the magnet frame 10. This provides substantially the same pole piece as that shown in Fig. 2.

Another modification of the pole piece arrangement shown in Fig. 2 is illustrated in Fig. 4, wherein a plurality of longitudinally extending laminations is secured together by spaced apart welds 14 extending through the laminations at points removed from the outer edges thereof. In this arrangement, a plurality of the outer laminations is formed with outwardly extending portions 20 at the ends thereof adapted to be arranged adjacent the magnet frame 10. This provides a larger contact section between the pole piece and the magnet frame, similar to the arrangements shown in Figs. 1 to 3, with substantially the same characteristics.

A further modification of my invention is illustrated in Fig. 5, wherein a group of laminations 21 is arranged to provide the main core portion of a pole piece and to extend longitudinally of the machine. The inner laminations do not extend outwardly radially as far as the outer laminations, and are arranged in stepped relation to provide a concave pole face. The outer ends of a plurality of the outer laminations on each side of the pole piece are formed with outwardly extending portions 22 which are arranged substantially at right angles to the main core portion of the laminations 21. These outwardly extending portions 22 provide supports for conductors of a field exciting winding which may be arranged to provide the magnetic excitation to the pole piece. As in the other illustrated arrangements, these laminations are secured together by welds 23 extending between adjacent laminations as spot welds formed at spaced apart points over the surface of the core removed from the outer edges thereof to provide a laminated core of substantially uniform magnetic properties throughout.

Fig. 6 illustrates a further modification of my invention, wherein a plurality of laminations 24 is assembled together so as to extend longitudinally of a dynamoelectric machine and is secured together by a plurality of spot welds 25 between adjacent laminations which are arranged in spaced apart relation over the surface of the laminations and which are removed from the outer edges thereof. In this arrangement, the outer lamination 26 on each side of the pole piece core is formed with transversely extending slots 27 adjacent the inner and outer edges thereof and extends inwardly from these edges. With this arrangement, the conductors of a field exciting winding may be arranged about the pole piece core and clamped in position thereon between portions 28 and 29 adjacent the inner and outer ends of the pole piece. These portions 28 and 29 may be bent outwardly to accommodate different sizes of windings within the limits of the lengths of the slots 27. This provides a very compact and economical pole piece construction which does not require the addition of separate bolts or rivets for securing together the laminations, and requires a minimum number of these laminations for a given pole piece core. Furthermore, the field exciting winding securing portions 28 and 29 of the outer laminations also provide a simplified arrangement for mounting these windings on the pole piece.

Fig. 7 illustrates a laminated core for a pole piece of a dynamoelectric machine provided with the conventional type circumferentially extending laminations and forms a pole piece substantially the same as that shown in Figs. 1 to 4, inclusive. This arrangement is secured together in the same manner as the other pole pieces described above, by a plurality of spot welds 30 between adjacent laminations 31. As in the other constructions, these spot welds are arranged in spaced apart relation about the surface of the laminations and are removed from the outer edges thereof, so as to minimize the short-circuiting effect between the adjacent laminations which otherwise might be provided by these welds. I have found that it is possible to clamp together and spot weld through a relatively large stack of laminations to provide the desired length for such a pole piece, but I prefer the arrangements illustrated by the other figures of the drawing.

Fig. 8 illustrates a modification of the arrangement shown in Fig. 5 wherein a group of laminations 21 is arranged to provide the main core portion of a pole piece extending longitudinally of the dynamoelectric machine. The inner laminations extend outwardly radially of the machine further than the outer laminations, as shown at 32, in order to provide a convex pole face. This type pole generally is more desirable than a pole piece having a flat pole face when mounted upon the rotatable member of a dynamoelectric machine, whereas a pole piece having a concave pole face, as in Fig. 5, is more adaptable to a dynamoelectric machine having stationary pole pieces. The outer ends of a plurality of the outer laminations on each side of the pole piece are formed with outwardly extending portions 22 which are arranged substantially at right angles to the main core portion of the laminations 21. These outwardly extending portions 22 are adapted to provide supports for conductors of a field exciting winding which may be arranged to provide the magnetic excitation to the pole piece. As in the other illustrated arrangements, the laminations 21 are secured together by welds 23 extending between adjacent laminations as spot welds formed at spaced apart points over the surface of the core removed from the outer edges thereof to provide a laminated core of substantially uniform magnetic properties throughout.

While I have illustrated and described particular embodiments of my invention, modifications thereof will occur to those skilled in the art. I desire it to be understood, therefore, that my invention is not to be limited to the particular arrangements disclosed, and I intend in the appended claims to cover all modifications which do not depart from the spirit and scope of my invention.

What I claim as new and desire to secure by Letters Patent of the United States is:

1. A dynamoelectric machine having a stationary member and a rotatable member, pole pieces secured to one of said members in circumferentially spaced apart relation, said pole pieces including a plurality of laminations arranged to extend longitudinally of said machine, means including a weld between adjacent laminations removed from the outer edges of said laminations for securing together said laminations, and outwardly extending portions formed of said laminations adjacent said frame.

2. In a dynamoelectric machine, a pole piece including a plurality of laminations, and means including a weld between adjacent laminations extending therethrough at a point removed from the outer edges thereof for securing together said laminations.

3. In a dynamoelectric machine, a pole piece including a plurality of laminations, and means including a plurality of welds between adjacent laminations extending therethrough at points removed from the outer edges thereof for securing together said laminations and for minimizing circulating currents through said welds.

4. In a dynamoelectric machine, a pole piece including a plurality of laminations arranged to extend longitudinally of said machine, and means including a weld between adjacent laminations extending therethrough at a point removed from the outer edges thereof for securing together said laminations.

5. In a dynamoelectric machine, a pole piece including a plurality of laminations, means including a weld between adjacent laminations extending therethrough at a point removed from the outer edges thereof for securing together said laminations, and means including outwardly extending portions formed integral on the outer laminations of said laminations and extending longitudinally thereof for supporting a field exciting winding thereon.

6. In a dynamoelectric machine, a pole piece including a plurality of laminations, means including a weld between adjacent laminations extending therethrough at a point removed from the outer edges thereof for securing together said laminations, and means including outwardly extending portions on the outer laminations of said laminations for supporting electrical conductors thereon.

7. In a dynamoelectric machine, a pole piece including a plurality of laminations arranged to extend longitudinally of said machine, means including a plurality of welds between adjacent laminations extending therethrough at points removed from the outer edges thereof for securing together said laminations and for minimizing circulating currents through said welds, and means including outwardly extending portions on the outer laminations of said laminations extending longitudinally thereof for supporting a field exciting winding thereon.

CHARLES E. KILBOURNE.